United States Patent [19]

Bridges

[11] 4,209,752
[45] Jun. 24, 1980

[54] GETTER PUMP FOR HYDROGEN MASER

[75] Inventor: William B. Bridges, Thousand Oaks, Calif.

[73] Assignee: The United States of America as represented by the Secretary of the Navy, Washington, D.C.

[21] Appl. No.: 932,745

[22] Filed: Aug. 10, 1978

[51] Int. Cl.² .............................................. H01S 1/06
[52] U.S. Cl. ..................................... 330/4; 252/181.6
[58] Field of Search ............ 330/4; 331/3, 94, 94.5 T; 313/7; 417/48, 51; 75/177; 252/181.6

[56] References Cited

U.S. PATENT DOCUMENTS

| 2,295,694 | 9/1942 | Slack et al. ......................... 252/181.6 |
| 2,972,697 | 2/1961 | Johnson et al. ........................... 330/4 |
| 3,210,673 | 10/1965 | Hoffmann ................................. 330/4 |
| 3,255,423 | 6/1966 | Ramsey et al. ........................... 330/4 |
| 3,287,660 | 11/1966 | Robinson ................................. 330/4 |
| 3,992,685 | 11/1976 | Ogren et al. ..................... 331/94.5 T |

FOREIGN PATENT DOCUMENTS 567119 12/1958 Canada .................................. 252/181.6
1302951 1/1971 Fed. Rep. of Germany ........ 252/181.6

OTHER PUBLICATIONS

Papa et al. "A Study to Identify Hydrogen Maser Failure Mode," 6/4/76, pp. 489-492, Proceeding of the 30th Annual Symposium on Frequency Control, Atlantic City, N.J. Abstract.

Primary Examiner—Nelson Moskowitz
Attorney, Agent, or Firm—R. S. Sciascia; Paul S. Collignon

[57] ABSTRACT

An improved getter for a hydrogen maser comprised of screened particles of zirconium-aluminum alloy. One or more pump bodies are connected with a hydrogen maser and each pump body contains a quantity of Zr-Al alloy particles. One or more screens are provided in a passageway connecting a pump body with a maser to allow passage of hydrogen into the pump body but preventing, in a zero-g environment, the alloy particles from leaving the pump body. The Zr-Al alloy particles are activated by heating.

1 Claim, 5 Drawing Figures

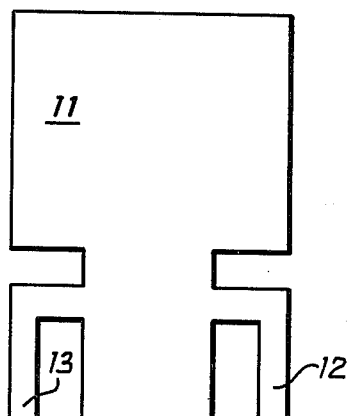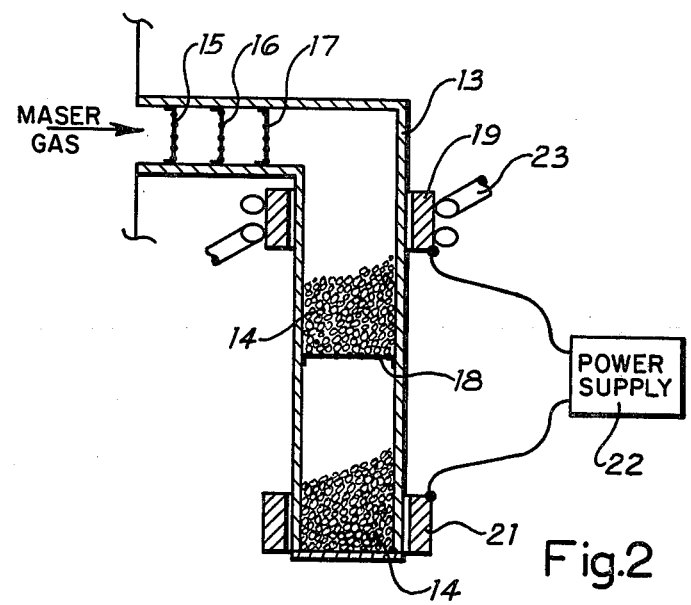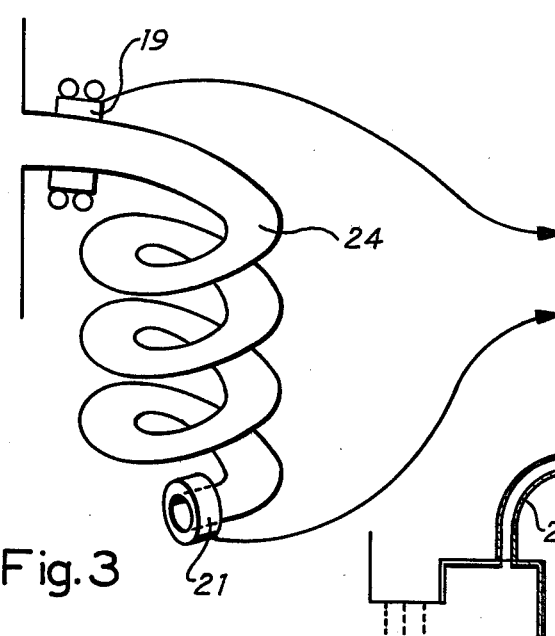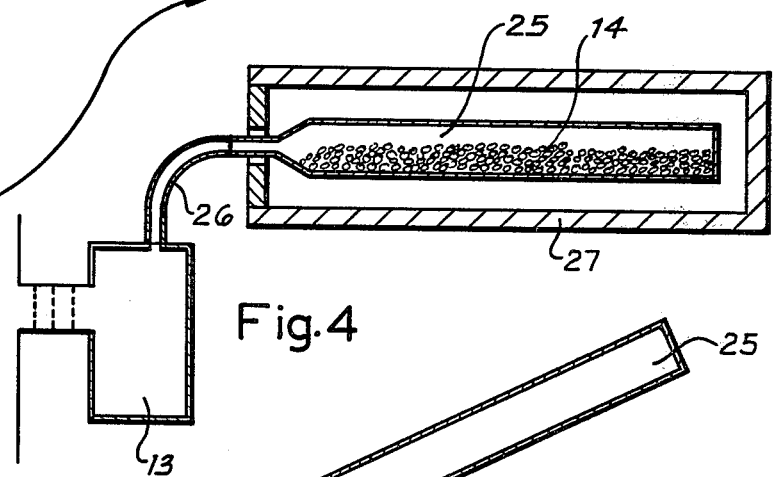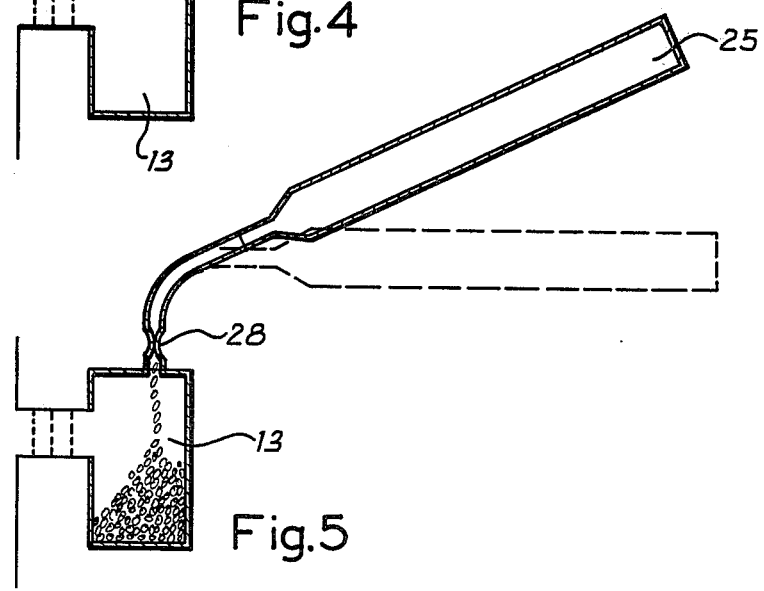

4,209,752

GETTER PUMP FOR HYDROGEN MASER

BACKGROUND OF THE INVENTION

The present invention relates to masers and more particularly to an improved getter for a hydrogen maser.

Apparatus of the maser type have been steadily improved since their inception in 1954 and now perform a variety of tasks in many diverse fields. Masers are frequently employed as very low noise amplifiers, are useful in some military radar applications, and are most useful in radio astronomy. At microwave frequencies, masers have been used as generators of radiation for clocks or frequency standards.

In U.S. Pat. No. 2,972,697, entitled, "Molecular Beam Apparatus Of The Maser Type", which issued Feb. 21, 1961, to Stanley A. Johnson and Ferris Eugene Alger, there is described the use of a getter for removing extraneous gases in a vacuum chamber. In this patented device, a getter chamber is connected with a vacuum chamber and the getter chamber contains a heater filament for evaporating a getter material, such as titanium, from a crucible. The titanium is deposited upon the inner walls of the getter chamber as a metallic film and serves as a getter for removing extraneous gases which may be present in the vacuum chamber. The filament is only heated at intervals for the purpose of renewing the getter film.

In a commercially available getter cartridge, a zirconium-aluminum alloy is sintered onto strips of iron and the active material is the zirconium-aluminum alloy. This getter, however, has the disadvantage in that the zirconium-aluminum alloy flakes off the iron substrate after absorbing about 20 Torr-liters/gm because the alloy becomes embrittled, swells and cracks upon absorbing hydrogen. These flakes continue to pump, that is, their equilibrium hydrogen pressure is still well below the $10^{-6}$ Torr pressure desired by the maser even after 20 Torr-liters/gm absorption, however, in a zero-g environment, these flakes drift around the pump, drift out the port and generally annoy the maser with their presence.

SUMMARY OF THE INVENTION

The present invention relates to an improved getter for a hydrogen maser and for a method of making the getter. A quantity of zirconium-aluminum alloy flakes are screened through a sieve to remove particles under about 100 $\mu$m. The larger size particles are then placed in thin-walled tubing which is connected with a hydrogen maser, and a passageway is provided between the tubing and the maser so that hydrogen can enter into the tubing through the passageway. At least one, and preferably several screens are placed in the passageway to retain the particles within the tubing when the hydrogen maser is used in a zero-g environment. The zirconium-aluminum alloy flakes are activated by heating to a temperature of 750 degrees C. for a period of one hour.

One method of heating the zirconium-aluminum alloy flakes is by passing high current directly through the thin-walled tubing. Clamp-on electrodes can be attached to the tubing, however, the electrode near the maser end of the pump tubing should be water-cooled to prevent heat from damaging the maser itself.

The zirconium-aluminum alloy flakes might also be heated by a removable oven rather than by using current and, alternately, the alloy flakes might be heated outside the tubing and then transferred to the tubing.

It is therefore a general object of the present invention to provide an improved getter for a hydrogen maser.

Other objects, advantages and novel features of the present invention will become apparent from the following detailed description of the invention when considered in conjunction with the accompanying drawing.

BRIEF DESCRIPTION OF THE DRAWING

FIG. 1 is a plan view of a hydrogen maser;
FIG. 2 is a partial sectional view of a maser pump;
FIG. 3 is another embodiment of a maser pump;
FIG. 4 is a diagrammatic view showing another method of heating zirconium-aluminum alloy particles; and
FIG. 5 is a diagrammatic view showing zirconium-aluminum alloy particles being transferred to a pump.

Referring now to the drawing, a hydrogen maser 11 is shown having two pump bodies 12 and 13 attached thereto, however, additional pump bodies may be used, if desired. As best shown in FIG. 2 of the drawing, particles of zirconium-aluminum alloy are placed within each pump body and one or more screens are provided to retain the particles inside the pump body. Three screens 15, 16, and 17, are shown in FIG. 2 of the drawing and the screens are of small mesh so that the particles of zirconium-aluminum alloy cannot pass through the screen holes. By way of example, the flakes of Zr-Al alloy might be sieved so that the particles greater than 100 $\mu$m are used, and the screens 15, 16, and 17 might have holes of about 30 $\mu$m. Screen 17 should prevent any particles of Zr-Al alloy from reaching screen 16 except if a larger hole should occur in screen 17 then screen 16 would prevent the metal particles from drifting out of the pump. Likewise, screen 15 serves as a back-up screen in the event that screen 16 would become damaged. An additional screen 18 is provided to prevent all the particles of metal alloys from clumping together in a zero-g environment. By way of example, one-half of the particles might be placed on each side of screen 18 or, if so desired, additional screens 18 might be provided to further divide the metal particles into several groups.

The zirconium-aluminum alloy flakes can be activated by heating the whole vacuum envelope. Referring to FIG. 2 of the drawing, there is shown one method of heating the metal flakes by passing a high current directly through the thin-walled stainless steel vacuum envelope. Electrodes 21 and 23 can be clamped around the thin-walled tubing and electrodes 21 and 23 are connected to power supply 22. The metal flakes should be heated to a temperature of 750 degrees C. for at least one hour and clamp-on electrode 23, which is nearer the maser end of the pump tubing should be water-cooled to prevent heat from damaging maser 11.

Referring now to FIG. 3 of the drawing, there is shown another embodiment for the maser pump. The pump body 24 is comprised of tubing which is would in a spiral coil and, thus, the greater length of tubing provides a greater volume so that a greater amount of metal alloy flakes can be used. One or more screens, similar to screen 15 shown in FIG. 2 of the drawing would be provided adjacent the maser end to prevent the flakes from floating out of the tubing when the device is used in a zero-g environment. Also, one or more screens similar to screen 18 shown in FIG. 2 of the drawing, could be provided in tubing 24 in order to prevent clumping together the whole mass of metal flakes 14.

Referring now to FIGS. 4 and 5, there is illustrated another method of activating, by heating, the flakes of zirconium-aluminum alloy. A metal container 25 holds flakes 14, and metel container 25 is connected with pump body 13 by means of tube 26. Container 25, tube 26 and pump body 13 are maintained under vacuum by an external, clean vacuum system and, while this vacuum is maintained, flakes 14 are heated by oven 27 for about one hour at a temperature of 750 degrees C. After heating, the flakes are cooled to room temperature and then transferred to pump body 13 by raising container 25, as shown in FIG. 5 of the drawing, so that flakes 14 pass through tube 26 into pump body 13. During heating and cooling of flakes 14, the maser, pump body 13, tube 26 and container 25 are all maintained under vacuum by an external, clean, vacuum system. After flakes 14 have all been transferred to pump body 13, tube 26 can be pinched-off so that container 25 and a portion of tube 26 can be removed.

In operation, one or more pump bodies may be provided for a hydrogen maser and each pump body is provided with a quantity of zirconium-aluminum alloy flakes 14. At least one screen, such as screen 15 which is shown in FIG. 2 of the drawing, is provided to keep the zirconium-aluminum alloy flakes within the pump body and, in a zero-g environment, prevent them from floating out of the pump body and into the maser. The zirconium-aluminum alloy flakes are activated by heating and pump, from the maser, hydrogen which passes through the screen and into the pump body.

The getter of the present invention has an advantage in that a very light vacuum envelope is provided as only active zirconium-aluminum material is used and no iron substrate is needed.

Obviously many modifications and variations of the present invention are possible in the light of the above teachings. It is therefore to be understood that the invention may be practiced otherwise than as specifically described.

I claim:

1. In a method of producing an improved getter for a hydrogen maser, the steps comprising, screening particles of zirconium-aluminum alloy to separate relatively large particles from smaller particles, then placing said relatively large particles of zirconium-aluminum alloy into a container connected by tubing to a pump body, then heating said container whereby said particles of zirconium-aluminum alloy are heated, then cooling said particles of zirconium-aluminum alloy, and then transferring said particles of zirconium-aluminum alloy to a pump body attached to a hydrogen maser through a screened passageway.

* * * * *